United States Patent
Beelitz et al.

(10) Patent No.: US 6,347,371 B1
(45) Date of Patent: Feb. 12, 2002

(54) SYSTEM AND METHOD FOR INITIATING OPERATION OF A COMPUTER SYSTEM

(75) Inventors: Alan E. Beelitz; Richard D. Amberg, both of Austin, TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/236,859

(22) Filed: Jan. 25, 1999

(51) Int. Cl.⁷ .................................................. G06F 9/24
(52) U.S. Cl. ........................................................ 713/2
(58) Field of Search ................................. 713/1, 2, 100

(56) References Cited

U.S. PATENT DOCUMENTS

| | | | |
|---|---|---|---|
| 5,134,580 A | * | 7/1992 | Bertram et al. |
| 5,261,104 A | * | 11/1993 | Bertram et al. ............. 395/700 |
| 5,307,497 A | | 4/1994 | Feigenbaum et al. |
| 5,418,918 A | * | 5/1995 | Kamp et al. ................... 713/2 |
| 5,557,799 A | | 9/1996 | Welman |
| 5,596,711 A | | 1/1997 | Burckhartt et al. |
| 5,694,600 A | | 12/1997 | Khenson et al. |
| 5,727,213 A | | 3/1998 | Vander Kamp et al. |
| 5,802,363 A | * | 9/1998 | Williams et al. ............... 713/2 |
| 5,860,001 A | * | 1/1999 | Cromer et al. ................. 713/1 |
| 5,933,631 A | * | 8/1999 | Mealey et al. ............. 395/652 |
| 5,944,820 A | * | 8/1999 | Beelitz ........................... 173/1 |
| 5,963,743 A | * | 10/1999 | Amberg et al. ............. 395/712 |
| 5,991,543 A | * | 11/1999 | Amberg et al. ............. 395/712 |
| 5,995,757 A | * | 11/1999 | Amberg et al. ............. 395/712 |
| 6,029,237 A | * | 2/2000 | Beelitz ........................ 711/173 |
| 6,032,223 A | * | 2/2000 | Beelitz ........................ 711/104 |
| 6,032,239 A | * | 2/2000 | Beelitz ........................ 711/173 |
| 6,041,395 A | * | 3/2000 | Beelitz ........................ 711/173 |
| 6,088,794 A | * | 7/2000 | Yoon et al. ..................... 713/2 |
| 6,158,002 A | * | 12/2000 | Kwan et al. .................... 713/2 |

FOREIGN PATENT DOCUMENTS

| | | |
|---|---|---|
| EP | 0 449 758 A2 | 10/1991 |
| EP | 0 483 865 A2 | 5/1992 |
| JP | 60074063 | 4/1985 |
| JP | 60116054 | 6/1985 |
| WO | WO 92/07319 | 4/1992 |

* cited by examiner

*Primary Examiner*—Dennis M. Butler
(74) *Attorney, Agent, or Firm*—Haynes and Boone, LLP

(57) ABSTRACT

A computer system includes first and second computer-readable media. The second computer-readable medium stores information specifying one of the first and second computer-readable media from which the computer system boots. The computer system reads the information from the second computer-readable medium and boots from the specified one of the first and second computer-readable media in response to an event and the information.

25 Claims, 3 Drawing Sheets

SYSTEM AND METHOD FOR INITIATING OPERATION OF A COMPUTER SYSTEM

The disclosures herein relate in general to information processing systems and in particular to a system and method for initiating operation of a computer system.

This application relates to co-pending U.S. patent application Ser. No. 09/198,731, filed Nov. 24, 1998, entitled COMPUTER SYSTEM AND METHOD FOR PREPARING A COMPUTER-READABLE MEDIUM, naming Alan E. Beelitz as inventor. The co-pending application is incorporated herein by reference in its entirety, and is assigned to the assignee of this application.

This application relates to co-pending U.S. patent application Ser. No. 09/198,007, filed Nov. 24, 1998, entitled COMPUTER SYSTEM AND METHOD FOR ACCESSING A COMPUTER-READABLE MEDIUM, naming Alan E. Beelitz as inventor. The co-pending application is incorporated herein by reference in its entirety, and is assigned to the assignee of this application.

This application relates to co-pending U.S. patent application Ser. No. 08/951,135, filed Oct. 15, 1997, now U.S. Pat. No. 5,944,820, entitled MODIFIABLE PARTITION BOOT RECORD FOR A COMPUTER MEMORY DEVICE, naming Alan Beelitz as inventor. The co-pending application is incorporated herein by reference in its entirety, and is assigned to the assignee of this application.

This application relates to co-pending U.S. patent application Ser. No. 08/984,386, filed Dec. 3, 1997, now U.S. Pat. No. 6,041,395, entitled SYSTEM AND METHOD FOR CHANGING PARTITION MAPPINGS TO LOGICAL DRIVES IN A COMPUTER MEMORY, naming Alan Beelitz as inventor. The co-pending application is incorporated herein by reference in its entirety, and is assigned to the assignee of this application.

This application relates to co-pending U.S. patent application Ser. No. 08/950,545, filed Oct. 15, 1997, now U.S. Pat. No. 6,032,239, entitled SYSTEM AND METHOD FOR UPDATING PARTITION MAPPINGS TO LOGICAL DRIVES IN A COMPUTER MEMORY DEVICE, naming Alan Beelitz as inventor. The co-pending application is incorporated herein by reference in its entirety, and is assigned to the assignee of this application.

This application relates to co-pending U.S. patent application Ser. No. 08/947,138, filed Oct. 8, 1997, now U.S. Pat. No. 6,029,237, entitled METHOD FOR SIMULATING A COMPUTER STORAGE DEVICE, naming Alan Beelitz as inventor. The co-pending application is incorporated herein by reference in its entirety, and is assigned to the assignee of this application.

This application relates to co-pending U.S. patent application Ser. No. 08/951,137, filed Oct. 15, 1997, now U.S. Pat. No. 6,032,223, entitled SYSTEM AND METHOD FOR UTILIZING A RAM DISK, naming Alan Beelitz as inventor. The co-pending application is incorporated herein by reference in its entirety, and is assigned to the assignee of this application.

This application relates to co-pending U.S. patent application Ser. No. 09/012,196, filed Jan. 23, 1998, now abandoned, entitled SYSTEM AND METHOD FOR PREPARING A COMPUTER MEMORY, naming Alan Beelitz as inventor. The co-pending application is incorporated herein by reference in its entirety, and is assigned to the assignee of this application.

This application relates to co-pending U.S. patent application Ser. No. 09/198,007, filed Nov. 24, 1998, entitled COMPUTER SYSTEM AND METHOD FOR ACCESSING A COMPUTER-READABLE MEDIUM, naming Alan Beelitz as inventor. The co-pending application is incorporated herein by reference in its entirety, and is assigned to the assignee of this application.

This application relates to co-pending U.S. patent application Ser. No. 09/198,731, filed Nov. 24. 1998, entitled COMPUTER SYSTEM AND METHOD FOR PREPARING A COMPUTER-READABLE MEDIUM, naming Alan Beelitz as inventor. The co-pending application is incorporated herein by reference in its entirety, and is assigned to the assignee of this application.

This application relates to co-pending U.S. patent application Ser. No. 08/920,773, filed Aug. 29, 1997, now U.S. Pat. No. 5,991,543, entitled SOFTWARE INSTALLATION AND TESTING FOR A BUILD-TO-ORDER COMPUTER SYSTEM, naming Richard D. Amberg, Roger W. Wong and Michael A. Brundridge as inventors. The co-pending application is incorporated herein by reference in its entirety, and is assigned to the assignee of this application.

This application relates to co-pending U.S. patent application Ser. No. 08/919,959, filed Aug. 29, 1997, now U.S. Pat. No. 5,995,757, entitled SOFTWARE INSTALLATION AND TESTING FOR A BUILD-TO-ORDER COMPUTER SYSTEM, naming Richard D. Amberg, Roger W. Wong and Michael A. Brundridge as inventors. The co-pending application is incorporated herein by reference in its entirety, and is assigned to the assignee of this application.

This application relates to co-pending U.S. patent application Ser. No. 08/921,438, filed Aug. 29, 1997, now U.S. Pat. No. 5,963,743, entitled DATABASE FOR FACILITATING SOFTWARE INSTALLATION AND TESTING FOR A BUILD-TO-ORDER COMPUTER SYSTEM, naming Richard D. Amberg, Roger W. Wong and Michael A. Brundridge as inventors. The co-pending application is incorporated herein by reference in its entirety, and is assigned to the assignee of this application.

BACKGROUND

Initiating operation of a computer system may be called "booting" (or "rebooting") the computer system. The computer system is booted in response to an event ("boot event"). Such a boot event may be, for example, a user "turning on" the computer system (e.g. the user causing application of electrical power to the computer system by switching an on/off button of the computer system). Alternatively, such a boot event may be receipt by the computer system of a command to initially execute the operating system software. For example, the computer system may receive such a command from the user (e.g. through an input device), or from a computer application executed by the computer system, or from another computer system (e.g. through a network).

In response to a boot event, the computer system initiates execution of software (e.g. operating system software such as Microsoft Windows). The computer system may read the software from a computer-readable medium, such as a hard disk or a floppy diskette. According to a previous technique, the computer system reads the software from (i.e. boots from) either: (a) the floppy diskette if such a diskette is present within the system, as for example if a floppy diskette is physically resident within the computer system's A: drive; or (b) the hard disk if no floppy diskette is present within the system.

A shortcoming of such a previous technique is that the computer system fails to provide an option to boot from the hard disk in a situation where a floppy diskette is present within the system. Such an option would be helpful in performing mass assembly and test of hundreds, or even thousands, of computer systems within a single day or other brief time period. For example, such an option may help reduce the number of times that a human user physically inserts a floppy diskette into (or removes a floppy diskette from) the computer system's A: drive during the assembly and test process. As part of a high volume computer assembly or manufacturing operation, such repeated insertion and removal is inefficient.

Accordingly, a need has arisen for a system and method for initiating operation of a computer system, in which various shortcomings of previous techniques are overcome.

SUMMARY

One embodiment, accordingly, provides for a computer system that includes first and second computer-readable media. The second computer-readable medium stores information specifying one of the first and second computer-readable media from which the computer system boots. The computer system reads the information from the second computer-readable medium and boots from the specified one of the first and second computer-readable media in response to an event and the information.

A principal advantage of this embodiment is that various shortcomings of previous techniques are overcome, and the computer system provides an option to boot from the hard disk even in a situation where a floppy diskette is present within the system.

DETAILED DESCRIPTION

Figure 1:
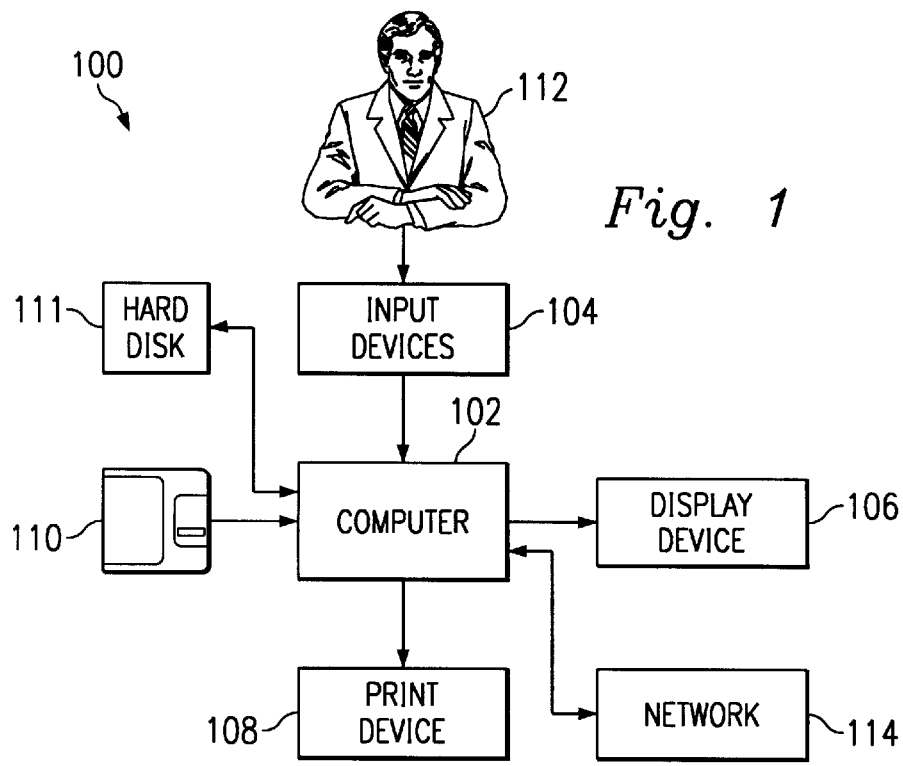
FIG. 1 is a block diagram of a computer system according to the illustrative embodiment.

FIG. 1 is a block diagram of a computer system, indicated generally at 100, according to the illustrative embodiment. System 100 includes input devices 104, a display device 106, a print device 108, and a computer 102 for executing processes and performing operations (e.g. communicating information) in response thereto as discussed further hereinbelow. In the illustrative embodiment, computer 102 is an IBM-compatible personal computer ("PC") that executes Microsoft Windows 95 operating system software. All Microsoft products identified herein are available from Microsoft Corporation, One Microsoft Way, Redmond, Wash. 98052-6399, telephone: (425) 882-8080.

Computer 102 is connected to input devices 104, display device 106 and print device 108. Display device 106 is, for example, a conventional electronic cathode ray tube. Print device 108 is, for example, a conventional electronic printer or plotter. Also, computer 102 includes internal speakers for outputting audio signals. In an alternative embodiment, the speakers are external to computer 102. Moreover, system 100 includes (a) a first computer-readable medium (or apparatus) 110 which is a floppy diskette and (b) a second computer-readable medium (or apparatus) 111 which is a computer hard disk.

A human user 112 and computer 102 operate in association with one another. For example, in response to signals from computer 102, display device 106 displays visual images, and user 112 views such visual images. Also, in response to signals from computer 102, print device 108 prints visual images on paper, and user 112 views such visual images. Further, user 112 operates input devices 104 in order to output information to computer 102, and computer 102 receives such information from input devices 104.

Input devices 104 include, for example, a conventional electronic keyboard and a pointing device such as a conventional electronic "mouse", rollerball or light pen. User 112 operates the keyboard to output alphanumeric text information to computer 102, and computer 102 receives such alphanumeric text information from the keyboard. User 112 operates the pointing device to output cursor-control information to computer 102, and computer 102 receives such cursor-control information from the pointing device.

Computer 102 is structurally and functionally interrelated with each of its connected computer-readable media (e.g. computer-readable media 110 and 111), as described further hereinbelow. For example, floppy diskette 110 stores (e.g. encodes, records, or embodies) functional descriptive material (e.g. including but not limited to computer programs (also referred to as software or applications) and information structures). Such functional descriptive material imparts functionality when encoded on floppy diskette 110. Also, such functional descriptive material is structurally and functionally interrelated to floppy diskette 110.

Within such functional descriptive material, information structures define structural and functional interrelationships between such information structures and floppy diskette 110 (and other aspects of system 100). Such interrelationships permit the information structures' functionality to be realized. Also, within such functional descriptive material, computer programs define structural and functional interrelationships between such computer programs and floppy diskette 110 (and other aspects of system 100). Such interrelationships permit the computer programs' functionality to be realized.

For example, computer 102 reads (e.g. loads, accesses, or copies) such functional descriptive material into a computer memory device (e.g. random access memory ("RAM")) of computer 102, and computer 102 performs its operations (as described elsewhere herein) in response to such material which is stored in such memory device. More particularly, computer 102 performs the operation of processing (e.g. executing) a computer application (that is stored, encoded, recorded or embodied on a computer-readable medium) for causing computer 102 to perform additional operations (as described elsewhere herein). Accordingly, such functional descriptive material exhibits a functional interrelationship with the way in which computer 102 executes its processes and performs its operations.

Further, floppy diskette 110 is an apparatus from which the computer application is accessible by computer 102, and the computer application is processable by computer 102 for causing computer 102 to perform such additional operations. In addition to reading such functional descriptive material from floppy diskette 110, computer 102 is capable of reading such functional descriptive material from (or through) a computer network 114 which is another type of computer-readable medium (or apparatus) connected to computer 102. Also, the memory device (of computer 102) is itself a computer-readable medium (or apparatus).

Network 114 includes a network local area network ("LAN") control manager server computer ("LCM"). The LCM is discussed further hereinbelow in connection with a NetPC. For communicating with (i.e. outputting information to, and receiving information from) network 114 (including the LCM), computer 102 includes a network interface card ("NIC") which is yet another type of computer-readable medium (or apparatus) connected to computer 102.

Figure 2:
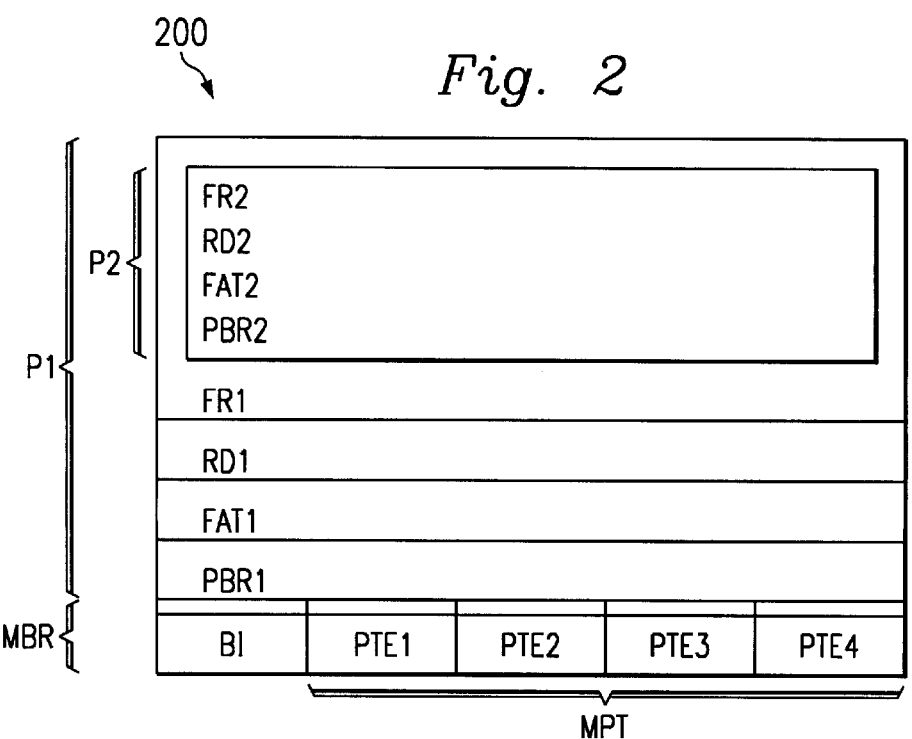
FIG. 2 is a conceptual illustration of information stored by a hard disk of the computer system of FIG. 1.

FIG. 2 is a conceptual illustration of information, indicated generally at 200, stored by hard disk 111. A drive controller of computer 102 outputs signals to hard disk 111, and hard disk 111 stores such information in response to such signals. Such information includes a master boot record MBR, as shown in FIG. 2. Also, in the example of FIG. 2, hard disk 111 includes partitions P1 and P2.

In the example of FIG. 2, partition P1 is a "primary" partition, and partition P2 is a "utility" partition that is located within FR1. FR1 of information 200 is sufficiently large to accommodate partition P2 within FRI. A utility partition may, for example, store programs and information that are useful during manufacture, assembly and test of system 100. Nevertheless, in at least one situation, such programs and information are less useful, and perhaps not even needed, during subsequent use and operation of system 100. In such a situation, after manufacture, assembly and test of system 100: (a) the utility partition itself is less useful, and perhaps not even needed; (b) as compared to the utility partition, a primary partition is more useful during subsequent use and operation of system 100; and (c) advantageously, system 100 of the illustrative embodiment is able to delete the utility partition so that sectors are reallocated from the utility partition to the primary partition. In that manner, the primary partition of the hard disk is advantageously enlarged to achieve a more versatile subsequent use and operation of system 100.

In accordance with the IBM-compatible personal computer ("PC") architecture, the MBR is the first sector (cylinder 0, head 0, sector 1) on hard disk 111. A sector is the smallest individually addressable unit of storage on hard disk 111. Under the IBM-compatible personal computer ("PC") architecture, hard disks have a sector size of 512 bytes. Accordingly, in the illustrative embodiment, to the extent that computer 102 forms (e.g. creates or modifies) a partition on hard disk 111, computer 102 defines the partition along cylinder boundaries. A cylinder is a unit of organization on hard disk 111 that is equal to the number of read/write heads multiplied by the number of sectors per track multiplied by the number of bytes per sector.

The MBR includes bootstrap instructions BI and a master partition table MPT for managing disk storage. In accordance with the IBM-compatible personal computer ("PC") architecture, the MPT includes four partition table entries, namely PTE1, PTE2, PTE3 and PTE4. A partition table entry PTEx (where x=1, 2, 3 or 4) includes information that describes the size, location, and type (extended, new technology file system ("NTFS"), 16-bit or 32-bit file allocation table ("FAT"), primary or utility) of a partition Px associated with such PTEx.

In response to a boot event, computer 102 initiates execution of operating system ("OS") software (e.g. Microsoft DOS or Microsoft Windows). Such a boot event may be, for example, user 112 "turning on" computer 102 (e.g. user 112 causing application of electrical power to computer 102 by switching an on/off button of computer 102). Alternatively, such a boot event may be receipt by computer 102 of a command to initially execute the operating system software. For example, computer 102 may receive such a command from user 112 (e.g. through input devices 104), or from a computer application executed by computer 102, or from another computer (e.g. through network 114).

Accordingly, in response to a boot event, computer 102 copies portions of the OS from a computer-readable medium (e.g. hard disk 111 or network 114) into the memory device of computer 102, and computer 102 executes such portions. Moreover, in response to executing the OS, computer 102 copies portions of application software from a computer-readable medium into the memory device of computer 102, and computer 102 executes such portions. Also, in response to executing the OS, computer 102 allocates a portion of its memory device for storing information structures.

Such information structures include information for identifying logical drives. For example, such information structures include information which identifies a respective logical drive associated with a partition Px of hard disk 111. More particularly, in the illustrative embodiment, such information structures include information that designates partition Px by an associated logical drive letter (e.g. C: or A:). The logical drive letter identifies a respective logical drive associated with partition Px.

In that manner, computer 102 designates (e.g. maps, or refers to) partition Px by its associated logical drive letter (e.g. C: or A:). With such designation, partition Px likewise is associated with the respective logical drive that is identified by such associated logical drive letter. However, without such designation, it is possible for a partition to be unassociated with any logical drive.

Accordingly, in response to executing the OS, computer 102 is able to designate primary partition P1 by letter C: and is able to designate utility partition P2 by letter A:. In that manner, computer 102 maps primary partition PI to a logical C: drive and maps utility partition P2 to a virtual A: drive. Such an A: drive is "virtual," because its actual storage space is located on hard disk 111 instead of floppy diskette 110.

As an example, in designating a partition by the letter C: associated with a respective logical C: drive, computer 102: (a) creates the information structures IS in the form of a drive data table ("DDT") and a drive parameter block ("DPB"); (b) modifies a current directory structure ("CDS") associated with the logical C: drive, which is implemented as a linear array rather than a linked list, such that computer 102 does not allocate additional memory space for the CDS; and (c) modifies a system variables ("SysVars") table of computer 102 to include an indication of the logical C: drive.

Each partition table entry PTEx includes a respective "active" flag. The drive controller of computer 102 outputs signals to hard disk 111, so that a maximum of only one of the four partition table entries PTEx is marked as "active" at any particular moment (i.e. only a maximum of one of the four "active" flags is set to a logic 1 true state at any particular moment). BI includes instructions for determining whether (and which) one of the partition table entries PTEx is marked as "active." In booting from hard disk 111 (in response to a boot event), computer 102 reads (or "copies") and executes portions of the OS from the active partition (i.e. partition Px associated with PTEx that is marked as "active") of hard disk 111.

Partition P1 includes a partition boot record PBR1, a file allocation table FAT1, a root directory RD1, and a file region FR1. Partition P2 includes a partition boot record PBR2, a file allocation table FAT2, a root directory RD2, and a file region FR2. PBRx is the partition boot record of Px, which is the partition associated with PTEx. In the illustrative embodiment, a PBRx is a single sector of information. BI and each PBRx include instructions according to the operating system software's type, version, and language. In response to signals from computer 102, an FRx stores information files.

Each FRx is divided into a number C of information clusters. A particular cluster is designated as cluster b, where b is an integer number between 0 and C−1. In the illustrative embodiment, the clusters within a particular FRx are equally sized, so that each cluster has a size=$2^y$, where y is an integer number and C * $2^y$ is less than or equal to the size of the particular FRx. Accordingly, PBRx includes a BIOS parameter block that specifies y and C for the particular FRx. Each FRx has its own respective size, and each partition has its own respective values of y and C.

In the illustrative embodiment, each root directory RDx includes space for storing up to 512 entries per RDx. Such an entry is associated with an information file and includes the file's filename (e.g. PROGRAM.EXE, DATA.DAT, COMMANDS.BAT), date, time, size, attributes (e.g. hidden), and starting cluster. The starting cluster is one of the C clusters within FRx.

For accessing a partition P1, the processor of computer 102 outputs a command to the drive controller of computer 102, and the drive controller receives such command. For example, such command is addressed to partition PI by specifying letter C: that designates partition P1. Before allocating a cluster for storing a file in response to such command addressed to partition P1, the drive controller verifies that the allocated cluster is associated with an Available entry within FAT1. Accordingly, so long as entries are Reserved instead of Available within FAT1, the drive controller does not so allocate clusters associated with such entries.

In that manner, by making a suitable number of entries Reserved within FAT1 of information 200, system 100 is able to reliably locate partition P2 within the suitable number of clusters of FR1. This is because such clusters associated with such Reserved entries are inaccessible by the processor of computer 102 outputting (to the drive controller) a command that is addressed to partition P1 (e.g. by specifying letter C: that designates partition P1). Instead, such clusters are accessible by the processor of computer 102 outputting (to the drive controller) a command that is addressed to partition P2 (e.g. by specifying letter A: that designates partition P2).

In the example of FIG. 2, computer 102 initializes the master partition table MPT (of the MBR) to a specific state for both primary partition P1 and utility partition P2. In the illustrative embodiment, utility partition P2 is relatively small (e.g. approximately ten megabytes). Initially, PTE1 is associated with primary partition P1, and PTE2 is associated with utility partition P2.

Notably, in response to a suitable "swap" command, computer 102 is able to execute a program that swaps the logical C: drive designation between primary partition P1 and utility partition P2. For example, if (immediately before receiving such a command) computer 102 designates primary partition P1 by letter C: and designates utility partition P2 by letter A:, then (in response to such a command) computer 102 modifies its mapping of partitions P1 and P2, so that computer 102 instead maps primary partition P1 to the virtual A: drive and maps utility partition P2 to the logical C: drive. Computer 102 accomplishes such a swap by modifying information within a DPB and DDT (e.g. for the logical C: drive) to incorporate parameters for either primary partition P1 or utility partition P2, as applicable.

In response to a suitable "delete partition" command (e.g. a command received by system 100 after manufacture, assembly and test of system 100), system 100 deletes utility partition P2 by: (a) suitably modifying the partition table entry PTEx (e.g. PTE2 in this example) associated with utility partition P2, so that partition P2 is no longer recognized by computer 102; (b) changing all Reserved entries stored by the hard disk within FAT1 of information 200 to be Available; and (c) marking (in the MPT) primary partition P1 as being active, so that computer 102 reads (or "copies") and executes instructions from PBR1 in response to a boot event.

Figure 3:
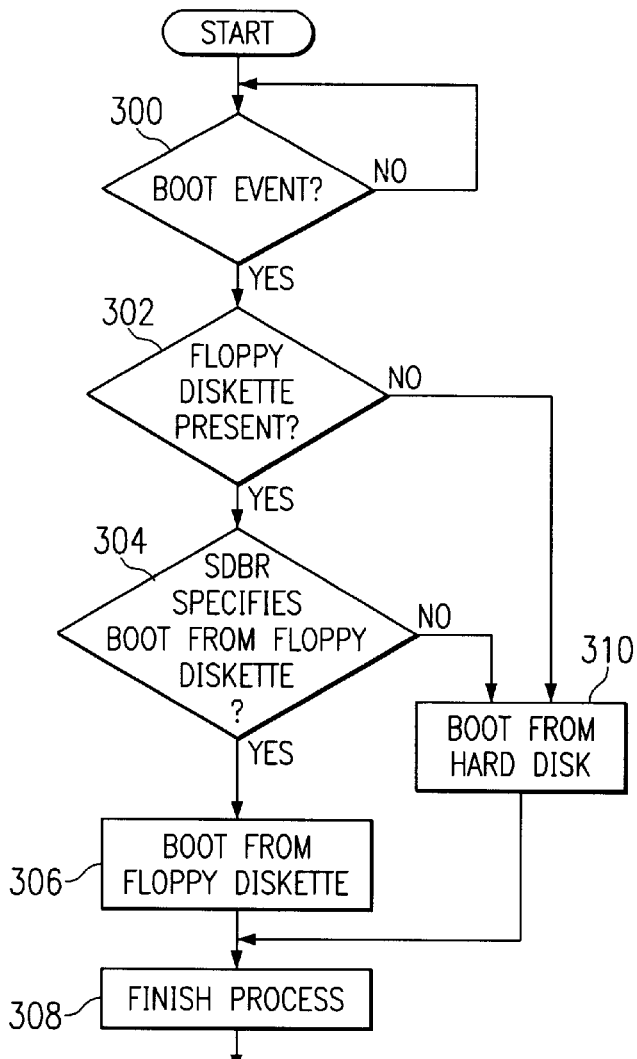
FIG. 3 is a first flowchart of operation of the computer system of FIG. 1.
Figure 4:
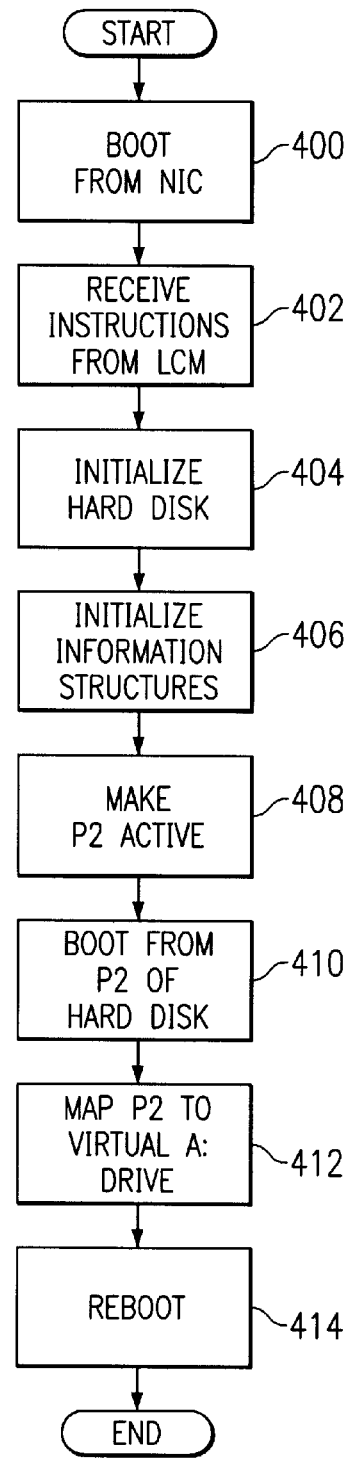
FIG. 4 is a second flowchart of operation of the computer system of FIG. 1.
Figure 5:
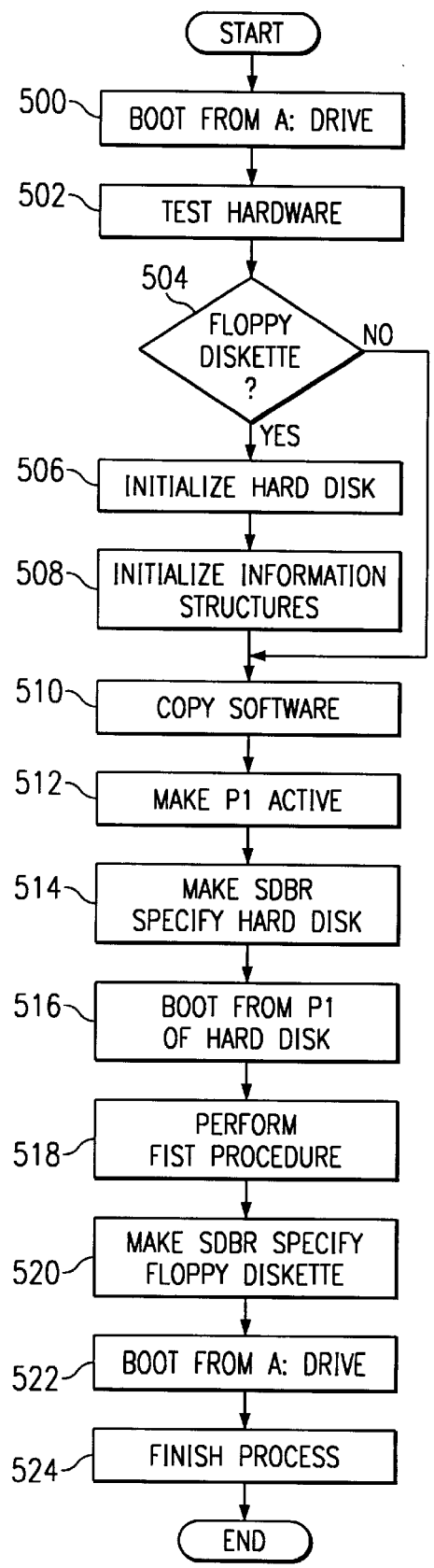
FIG. 5 is a third flowchart of operation of the computer system of FIG. 1.

FIGS. 3, 4 and 5 are flowcharts of operation of system 100. In a significant aspect of the illustrative embodiment, floppy diskette 110 includes a special diskette boot record SDBR, which is the first sector (track 0, head 0, sector 1) on floppy diskette 110. A sector is the smallest individually addressable unit of storage on floppy diskette 110. Under the IBM-compatible personal computer ("PC") architecture, floppy diskettes have a sector size of 512 bytes.

The SDBR stores information for specifying whether system 100 boots from floppy diskette 110 or instead from hard disk 111. During the boot process, computer 102 reads such information from the SDBR in response to instructions from a read-only memory ("ROM") basic input/output system ("BIOS") of computer 102. In response to such information from the SDBR, computer 102 determines whether to boot from floppy diskette 110 or instead from hard disk 111.

System 100 includes software for modifying such information in the SDBR. Notably, in response to user 112 pressing an ALT key of a keyboard of input devices 104 during the boot process, system 100 ignores such information and boots in a conventional manner (i.e. boots from floppy diskette 110 if floppy diskette 110 is physically resident within the A: drive of system 110, and boots from hard disk 111 if floppy diskette 110 is physically absent from the A: drive of system 100).

Referring to FIG. 3, the operation begins at a step 300 where computer 102 determines whether a new boot event has occurred. If a new boot event has occurred, computer 102 determines at a step 302 whether floppy diskette 110 is physically resident within the A: drive of system 110. If floppy diskette 110 is physically resident within the A: drive of system 110, computer 102 determines at a step 304 whether the SDBR stores information for specifying that system 100 boots from floppy diskette 110.

If the SDBR stores information for specifying that system 100 boots from floppy diskette 110, computer 102 boots from floppy diskette 110 at a step 306. After booting from floppy diskette 110 at step 306, computer 102 finishes the process (which varies according to the specific application) at a step 308.

If (at step 302) floppy diskette 110 is physically absent from the A: drive of system 110, computer 102 boots from hard disk 111 at a step 310. In a significant aspect of the illustrative embodiment, if (at step 304) the SDBR stores information for specifying that system 100 boots from hard disk 111 instead of floppy diskette 110, computer 102 boots from hard disk 111 at step 310. After step 310, the operation continues to step 308.

In booting from hard disk 111, computer 102:
(a) reads instructions into a memory device of computer 102: (i) from BI; and (ii) from PBRx if partition table entry PTEx is marked as "active;" and
(b) executes such instructions in response to instructions from a read-only memory ("ROM") basic input/output system ("BIOS") of computer 102.

In booting from floppy diskette 110, computer 102:

(a) reads instructions into a memory device of computer 102 from a file named IO.SYS on floppy diskette 110; and (b) executes such instructions.

In the illustrative embodiment, system 100 stores software on the A: drive for performing the manufacture, assembly and test process. Accordingly, in the illustrative embodiment, system 100 includes a physical A: drive in which floppy diskette 110 is physically resident, and the A: drive is associated with floppy diskette 110. Conversely, as discussed further hereinbelow in connection with FIG. 4, if computer 102 is a NetPC (i.e. a PC that has no physical A: drive and relies upon a connection to network 114 in order to receive and output information to and from another system), system 100 configures hard disk 111 such that the A: drive is associated with utility partition P2 of hard disk 111 (i.e. a virtual A: drive).

Referring to FIG. 4, if computer 102 is a NetPC, floppy diskette 110 is physically absent from the A: drive of system 100, and hard disk 111 initially is blank and does not contain partitioning information (i.e. hard disk 111 initially is unformatted). As shown in FIG. 4, the operation begins at a step 400 where computer 102 boots from (i.e. reads and executes portions of the Microsoft DOS operating system software from) its network interface card ("NIC") which is discussed further hereinabove in connection with FIG. 1. After booting from the NIC, computer 102 communicates (at a step 402) through network 114 with the LCM of network 114 which is discussed further hereinabove in connection with FIG. 1.

In response to instructions from the LCM, computer 102 (a) initializes (e.g. writes information to) hard disk 111 at a step 404 in accordance with the example of FIG. 2, (b) initializes the information structures at a step 406 for identifying logical drives in accordance with the example of FIG. 2, and (c) designates utility partition P2 as the active partition at a step 408 in accordance with the example of FIG. 2.

After step 408, computer 102 boots from utility partition P2 of hard disk 111 at a step 410. After step 410, computer 102 maps utility partition P2 to a virtual A: drive at a step 412. After step 412, computer 102 generates (at a step 414) a "reboot" command which is a boot event, as discussed further hereinbelow in connection with step 500 of FIG. 5.

Even if computer 102 includes a physical A: drive in which floppy diskette 110 is physically resident (i.e. even if computer 102 is not a NetPC), hard disk 111 initially is blank and does not contain partitioning information. Accordingly, irrespective of whether computer 102 is a NetPC, computer 102 of the illustrative embodiment performs the operation set forth in FIG. 5. Nevertheless, computer 102 begins the operation set forth in FIG. 5 after performing step 412 of FIG. 4, such that step 414 is achieved by step 500. Moreover, at the beginning of the operation set forth in FIG. 5, if floppy diskette 110 is physically resident within the A: drive of system 110, the SDBR of floppy diskette 110 initially stores information for specifying that system 100 boots from floppy diskette 110.

Referring to FIG. 5, the operation begins at step 500 where computer 102 boots from the A: drive, which is utility partition P2 of hard disk 111 (i.e. the virtual A: drive) if computer 102 is a NetPC, and which is floppy diskette 110 if floppy diskette 110 is physically resident within the A: drive of system 110. After booting from the A: drive, computer 102 executes instructions (some received from network 114) for testing hardware of system 100 at a step 502. After testing hardware of system 100, computer 102 determines at a step 504 whether floppy diskette 110 is physically resident within the A: drive of system 110.

If floppy diskette 110 is physically resident within the A: drive of system 110, computer 102 (a) initializes hard disk 111 at a step 506 in accordance with the example of FIG. 2, and (b) initializes the information structures at a step 508 for identifying logical drives in accordance with the example of FIG. 2. This is because, if computer 102 is a NetPC, computer 102 has already performed such initialization in steps 404 and 406 of FIG. 4. After step 508, or if computer 102 determines at step 504 that floppy diskette 110 is physically absent from the A: drive of system 110, the operation continues to a step 510.

At step 510, computer 102 copies software (e.g. device driver software, applications software, and Microsoft Windows operating system software) from network 114 to hard disk 111. After step 510, computer 102 designates (at a step 512) primary partition P1 as the active partition in accordance with the example of FIG. 2. In a significant aspect of the illustrative embodiment, after step 512: (a) if floppy diskette 110 is physically resident within the A: drive of system 110, computer 102 stores (at a step 514) information in the SDBR for specifying that system 100 boots from hard disk 111 instead of floppy diskette 110; and (b) if floppy diskette 110 is physically absent from the A: drive of system 110, the operation continues directly to a step 516.

Accordingly, after step 514, computer 102 boots from primary partition P1 of hard disk 111 (i.e. C: drive) at step 516, even if floppy diskette 110 is physically resident within the A: drive of system 110, as discussed further hereinabove in connection with FIG. 3. After step 516, computer 102 performs a substantially fully integrated system test ("FIST") procedure at a step 518. In yet another significant aspect of the illustrative embodiment, after step 518: (a) if floppy diskette 110 is physically resident within the A: drive of system 110, computer 102 stores (at a step 520) information in the SDBR for specifying that system 100 boots from floppy diskette 110 instead of hard disk 111; and (b) if floppy diskette 110 is physically absent from the A: drive of system 110, computer 102 designates (at step 520) utility partition P2 as the active partition. Accordingly, after step 520, computer 102 (a) boots from the A: drive at a step 522 and (b) at a step 524, in response to instructions from the A: drive, reads and executes further instructions from network 114 in order to finish performing the manufacture, assembly and test process.

When system 100 boots as a scheduled event in response to a "reboot" command (e.g. steps 410, 414, 516, 522), system 100 stores information in a flag file of the active partition on hard disk 111. Such information (in the flag file) indicates that system 100 is booting as a scheduled event, rather than as an unscheduled (e.g. accidental) event. Notably, in the illustrative embodiment, computer 102 is able to read information from hard disk 111 faster than floppy diskette 110, thereby providing an advantage to booting from a virtual A: drive on hard disk 111 instead of the physical A: drive in which floppy diskette 110 physically resides.

System 100 includes RTC hardware for operating a real time clock, system bus, and memory of system 100. RTC hardware includes a nonvolatile battery-backed complementary metal oxide semiconductor ("CMOS") static random access memory ("SRAM") for storing computer configuration information. According to industry standard techniques, system 100 modifies the computer configuration information by outputting suitable commands to port addresses 70H and 71H. Port addresses 70H and 71H are associated with RTC hardware. Accordingly, in an alternative embodiment, system 100 suitably modifies the computer configuration information so that, when system 100 is subsequently booted, system 100 does not recognize that the floppy diskette remains present within system 100.

Nevertheless, such an alternative embodiment is less preferable than the illustrative embodiment, because:

(a) the format of the CMOS SRAM varies between vendors, thereby increasing the difficulty in practically implementing the alternative embodiment;

(b) the CMOS SRAM may be difficult to properly reset before shipment to the end user;

(c) the modified computer configuration information in the CMOS SRAM may be inconsistent with information stored in the BIOS, especially in identifying the presence of a floppy diskette, such that an operating system (e.g. Microsoft Windows 95) of system 100 may be inadequately designed to accommodate such an inconsistency when reading from both the BIOS and CMOS SRAM; and (d) the alternative embodiment may be less practical in a situation where computer 102 is a NetPC (i.e. a PC that has no floppy diskette and relies upon a connection to network 114 in order to receive and output information to and from another system) because, according to generally practiced industry techniques, the CMOS SRAM of the RTC hardware may have too little memory space for storing partition information, thereby increasing the difficulty in implementing the alternative embodiment to boot from either a virtual A: drive or a C: drive.

Although illustrative embodiments have been shown and described, a wide range of modification, change and substitution is contemplated in the foregoing disclosure and, in some instances, some features of the embodiments may be employed without a corresponding use of other features. Accordingly, it is appropriate that the appended claims be construed broadly and in a manner consistent with the scope of the embodiments disclosed herein.

What is claimed is:

1. A computer system, comprising:

a computer including operating system software and memory;

a first computer-readable medium;

a second computer-readable medium for storing information specifying one of the first and second computer-readable media from which the computer system boots;

means for reading the information from the second computer-readable medium and booting the computer system from the specified one of the first and second computer-readable media in response to an event and information;

in response to booting, the computer copies portions of the operating system software from the media into the memory and the computer executes the operating system software portions; and in response to executing the operating system software portions, the computer copies portions of the application software from the media into the memory and the computer executes the application software portions.

2. The computer system of claim 1 wherein the first computer-readable medium is a hard disk.

3. The computer system of claim 1 wherein the second computer-readable medium is a floppy diskette.

4. The computer system of claim 1 wherein the means initiates operation of the computer system during the booting.

5. The computer system of claim 4 wherein the means reads and initiates execution of software while initiating operation of the computer system.

6. The computer system of claim 5 wherein the software is operating system software.

7. The computer system of claim 5 wherein the means reads the software from the specified one of the first and second computer-readable media.

8. The computer system of claim 1 wherein the means is for modifying the information to specify a different one of the first and second computer-readable media from which the computer system boots.

9. A method for a computer system that includes first and second computer-readable media, comprising:

providing a computer including operating system software and memory;

on the second computer-readable medium, storing information specifying one of the first and second computer-readable media from which the computer system boots;

reading the information from the second computer-readable medium;

booting the computer system from the specified one of the first and second computer-readable media in response to an event and the information;

in response to booting, the computer copying portions of the operating system software from the media into the memory and the computer executing the operating system software portions; and in response to executing such operating system software portions, the computer copying portions of the application software from the media into the memory and the computer executing the application software portions.

10. The method of claim 9 wherein the first computer-readable medium is a hard disk, and storing the information comprises:

on the second computer-readable medium, storing the information specifying one of the hard disk and the second computer-readable medium from which the computer system boots.

11. The method of claim 9 wherein the second computer-readable medium is a floppy diskette, and storing the information comprises:

on the floppy diskette, storing the information specifying one of the first computer-readable medium and the floppy diskette from which the computer system boots.

12. The method of claim 9 wherein booting the computer system comprises:

initiating operation of the computer system.

13. The method of claim 12 wherein booting the computer system comprises:

reading and initiating execution of software while initiating operation of the computer system.

14. The method of claim 13 wherein booting the computer system comprises:

reading and initiating execution of operating system software while initiating operation of the computer system.

15. The method of claim 13 wherein reading and initiating execution of the software comprises:

reading the software from the specified one of the first and second computer-readable media.

16. The method of claim 9 and comprising:
modifying the information to specify a different one of the first and second computer-readable media from which the computer system boots.

17. A computer program product for a computer system that includes first and second computer-readable media, comprising:
- a computer including operating system software and memory;
- a computer program processable by the computer system for causing the computer system to:
  - read information from the second computer-readable medium, the information specifying one of the first and second computer-readable media from which the computer system boots; and
  - boot from the specified one of the first and second computer-readable media in response to an event and the information;
- apparatus including the computer program from which the computer program is accessible by the computer system;
- in response to booting, the computer copies portions of the operating system software from the media into the memory and the computer executes the operating system software portions; and
- in response to executing the operating system software portions, the computer copies portions of application software from the media into the memory and the computer executes the application software portions.

18. The computer program product of claim 17 wherein the first computer-readable medium is a hard disk, and the computer program is processable by the computer system for causing the computer system to:
read the information from the second computer-readable medium, the information specifying one of the hard disk and the second computer-readable medium from which the computer system boots.

19. The computer program product of claim 17 wherein the second computer-readable medium is a floppy diskette, and the computer program is processable by the computer system for causing the computer system to:
read the information from the floppy diskette, the information specifying one of the first computer-readable medium and the floppy diskette from which the computer system boots.

20. The computer program product of claim 17 wherein the computer program is processable by the computer system for causing the computer system to:
initiate operation of the computer system during the boot.

21. The computer program product of claim 20 wherein the computer program is processable by the computer system for causing the computer system to:
read and initiate execution of software while initiating operation of the computer system.

22. The computer program product of claim 21 wherein the computer program is processable by the computer system for causing the computer system to:
read and initiate execution of operating system software while initiating operation of the computer system.

23. The computer program product of claim 21 wherein the computer program is processable by the computer system for causing the computer system to:
read the software from the specified one of the first and second computer-readable media.

24. The computer program product of claim 17 wherein the computer program is processable by the computer system for causing the computer system to:
modify the information to specify a different one of the first and second computer-readable media from which the computer system boots.

25. A computer system, comprising:
- a computer including operating system software, memory and computer-readable media including a hard disk and a floppy diskette for storing information specifying one of the hard disk and the floppy diskette from which the computer system boots;
- means for:
  - reading the information from the floppy diskette;
  - booting the computer system from the specified one of the hard disk and the floppy diskette in response to a boot event and the information; and
  - modifying the information to specify a different one of the hard disk and the floppy diskette from which the computer system boots;
- wherein in response to the booting, the computer:
  - copies portions of the operating system software from the media into the memory and the computer executes the operating system software portions; and
- wherein in response to executing the operating system software portions, the computer:
  - copies portions of application software from the media into the memory and the computer executes the application software portions.

* * * * *